US009932963B2

United States Patent
Hansen

(10) Patent No.: US 9,932,963 B2
(45) Date of Patent: Apr. 3, 2018

(54) METHOD FOR ADJUSTING THE AZIMUTH OF A WIND POWER PLANT, AZIMUTH ADJUSTMENT SYSTEM AND WIND POWER PLANT

(71) Applicant: SENVION SE, Hamburg (DE)

(72) Inventor: Marco Hansen, Groven (DE)

(73) Assignee: Senvion SE, Hamburg (DE)

( * ) Notice: Subject to any disclaimer, the term of this patent is extended or adjusted under 35 U.S.C. 154(b) by 476 days.

(21) Appl. No.: 14/807,635

(22) Filed: Jul. 23, 2015

(65) Prior Publication Data
US 2015/0330361 A1 Nov. 19, 2015

Related U.S. Application Data

(63) Continuation of application No. PCT/EP2014/000150, filed on Jan. 21, 2014.

(30) Foreign Application Priority Data

Jan. 24, 2013 (DE) .................. 10 2013 201 162

(51) Int. Cl.
F03D 7/02 (2006.01)
F03D 80/00 (2016.01)
F03D 9/25 (2016.01)

(52) U.S. Cl.
CPC ......... F03D 7/0204 (2013.01); F03D 7/0244 (2013.01); F03D 9/25 (2016.05);
(Continued)

(58) Field of Classification Search
CPC .... F03D 7/0204; F03D 7/0244; F03D 7/0208; F03D 7/042; F03D 7/043; F03D 9/25;
(Continued)

(56) References Cited

U.S. PATENT DOCUMENTS 8,162,608 B2 * 4/2012 Birkemose ............ F03D 7/0204
416/1
2004/0253093 A1 12/2004 Shibata et al.
(Continued)

FOREIGN PATENT DOCUMENTS

DE 10023440 C1 12/2001
DE 102008004948 A1 * 7/2009 ........... F03D 7/0204

OTHER PUBLICATIONS

International Search Report dated May 23, 2014 in corresponding International Patent Application No. PCT/EP2014/000150.

*Primary Examiner* — Logan Kraft
*Assistant Examiner* — Sabbir Hasan
(74) *Attorney, Agent, or Firm* — Rankin, Hill & Clark, LLP

(57) ABSTRACT

A method for adjusting the azimuth of a wind power plant, in which, during an azimuthal rotation of a machine housing with a rotor on a tower of the wind power plant, a constant residual pressure for generating a constant residual holding torque is applied to at least one azimuth braking device. Also an azimuth adjustment system for a wind power plant and to a wind power plant. In the disclosed method, the constant residual pressure and/or the constant residual holding torque are/is set as a function of at least one wind speed parameter before commencement of the azimuthal rotation, and the residual pressure and/or the residual holding torque are/is not changed during the azimuthal rotation, in particular during energization of azimuth drive motors.

17 Claims, 3 Drawing Sheets

(52) U.S. Cl.
CPC ........ *F03D 80/00* (2016.05); *F05B 2260/902* (2013.01); *F05B 2270/32* (2013.01); *Y02E 10/723* (2013.01)

(58) Field of Classification Search
CPC ........... F05B 2260/90; F05B 2260/902; Y02E 10/723
See application file for complete search history.

(56) References Cited

U.S. PATENT DOCUMENTS

2011/0171022 A1* 7/2011 Behnke ................ F03D 7/0204
  416/1
2011/0309620 A1 12/2011 Fujino et al.

* cited by examiner

METHOD FOR ADJUSTING THE AZIMUTH OF A WIND POWER PLANT, AZIMUTH ADJUSTMENT SYSTEM AND WIND POWER PLANT

CROSS-REFERENCE TO RELATED APPLICATIONS

This application is a continuation of PCT/EP2014/000150, filed Jan. 21, 2014, and claims priority to DE 10 2013 201 162.8, filed Jan. 24, 2013.

BACKGROUND OF INVENTION

Field of Invention

The invention relates to a method for adjusting the azimuth of a wind power plant, in which, during an azimuthal rotation of a machine housing with a rotor on a tower of the wind power plant, a constant residual pressure for generating a constant residual holding torque is applied to at least one azimuth braking device. The invention also relates to an azimuth adjustment system for a wind power plant and to a wind power plant.

Brief Description of Related Art

The azimuth adjustment system of a wind power plant has the function of rotating the machine housing with the rotor on the tower into the wind again, that is to say of adjusting its azimuth position or the azimuth angle, during operation of a wind power plant when the wind direction changes beyond a predeterminable amount. A further object is to move the azimuth position of the machine housing or of the gondola of the wind power plant in order to untwist the cables, which lead from the machine housing into the tower, if the machine housing has been moved in one direction to such an extent that maximum permissible twisting of the cables has taken place. Finally, the azimuth angle of the machine housing can also be moved with the rotor, in order to set a predetermined position, for example for maintenance work, when the wind power plant is stationary, which predetermined position is desired, for example, for the approach of a helicopter, in particular in offshore wind power plants.

In order to adjust the machine housing or the gondola with the rotor in its azimuth position, the wind power plant has one or more azimuth drives which usually each have a motor or two motors with a gear mechanism which is connected downstream and has a gearwheel or gearwheels which engage or engages in a corresponding crown gear on the tower, or vice versa. In addition, the azimuth adjustment system has at least one azimuth braking device, for example with brake calipers, which act on a brake disk. Said brake calipers serve to lock the machine housing in the adopted azimuth position, after the azimuth adjustment has ended, with the result that the azimuth adjustment drives are no longer loaded.

The azimuth braking devices also have a function during an azimuth adjustment process. A residual pressure is usually applied to them in order to generate a residual holding torque. Said residual holding torque serves to decouple the azimuth drives from external interference influences which occur, for example, as a result of the fact that gusts of wind act on the rotor of the wind power plant and exert an azimuthal torque on the machine housing. Without the residual holding torque applied by the azimuth braking devices, the azimuth torque would be conducted directly onto the azimuth drives, which would as a result adversely affect them in terms of their function and their service life.

DE 10 2008 004 948 A1 discloses a method for rotating a machine housing of a wind power plant by moving an azimuth adjustment device, in which method, during the movement of the azimuth adjustment device by means of a braking device, a residual holding torque which brakes the azimuth adjustment device is maintained. In this case, during the movement of the azimuth adjustment device a rotational speed and/or a torque of an azimuth drive of the azimuth adjustment device are measured, and in the case of a deviation of the measured parameter from a setpoint value the magnitude of the holding torque exerted by the braking device is regulated in such a way that the at least one operating parameter is approximated again to the setpoint value. In this way, rotational speed fluctuations of the azimuth drive which occur are reduced. The entire contents of the disclosure in DE 10 2008 004 948 A1 are to be incorporated into the present patent application by reference.

The method which is specified therein constitutes a regulating process with which the motors of the azimuth adjustment device operate particularly constantly, since wind influences which assist or impair the azimuth adjustment are compensated by increasing or reducing the residual holding torque. It is disadvantageous here that the measurement is very susceptible to faults because the sensor can fail and the regulating speed of the regulating circuit can be an impediment, starting from the measured motor rotational speed or the torque of the azimuth adjustment device via the change in the residual holding torque as far as the associated change in the rotational speed or the torque of the azimuth drive. The corresponding azimuth drives also have to be regulated in terms of their rotational speed, and the control of the controller as well as a variable application of pressure for the brake calipers of the azimuth braking device are comparatively costly.

In contrast, the present invention is based on the object of making available a method, an azimuth adjustment system and a wind power plant in which azimuth adjustments can be implemented cost effectively and with a high level of operational reliability and little wear on azimuth braking calipers or azimuth braking devices.

BRIEF SUMMARY OF THE INVENTION

The object on which the invention is based is achieved by means of a method for adjusting the azimuth of a wind power plant, in which, during an azimuthal rotation of a machine housing with a rotor on a tower of the wind power plant, a constant residual pressure for generating a constant residual holding torque is applied to at least one azimuth braking device, which is developed in that the constant residual pressure and/or the constant residual holding torque are/is set as a function of at least one wind speed parameter before the start of the azimuthal rotation.

The residual pressure and/or the residual holding torque are/is preferably set as a function of the at least one wind speed parameter before the start of the azimuthal rotation. Therefore, when a new azimuth setpoint position is requested, the residual holding torque or the residual pressure is firstly set as a function of the prevailing wind speed before the adjustment process is initiated. Therefore, the residual pressure or the residual holding torque is already in the optimum range for the prevailing wind speed, and the wear of the azimuth braking device is as low as necessary.

According to the invention, the residual pressure and/or the residual holding torque are/is not changed during the azimuthal rotation, in particular during the time of energization of azimuth drive motors. Therefore, during the azimuthal rotation the residual pressure is a constant residual pressure and the residual holding torque is a constant residual holding torque. If no azimuthal rotation takes place, the residual pressure or the residual holding torque can be set in a variable fashion.

In contrast to the regulating system according to DE 10 2008 004 948 A1, a measure for the wind speed is therefore used, in particular exclusively, in order to set the residual pressure and/or the residual holding torque for the movement process. Regulation with a regulating circuit does not take place. It is therefore possible to set a low residual holding torque when the wind is low and to set a correspondingly stronger residual holding torque or residual pressure when the wind speeds are relatively high. The wear of the azimuth braking device is therefore reduced, since at a low wind speed it is also only necessary to implement a correspondingly low residual holding torque.

The method according to the invention is also cost effective, since the azimuth drive now no longer has to be rotational-speed regulated, and the costs for an additional sensor and the corresponding maintenance costs are eliminated. The control of the controller can be embodied significantly more simply than hitherto.

The at least one wind speed parameter is preferably based on a measurement of the wind speed with at least one anemometer, on a generator power and/or a blade pitch angle of rotor blades of a rotor of the wind power plant, wherein, in particular, a formation rule for the at least one wind speed parameter is defined as a function of a current operating mode of the wind power plant. The wind speed parameter is therefore a genuine measure of the wind speed and can signify, for example, a calculation of the measurement variable into the wind speed. The simplest case of a wind speed measurement is the direct measurement with an anemometer. Since anemometers are usually arranged on the machine housing and therefore in the turbulence zone of the rotor, these measurements are, however, susceptible to faults. However, through suitable averaging, for example, it is possible for an appropriate wind speed signal to be obtained therefrom. Also, when the wind power plant is stationary, only the signal of the anemometer is present, but owing to the stationary state of the rotor the measurement of the anemometer is also less falsified.

In many wind power plants, the generator power and the blade pitch angles of the rotor blades are a stable measure of the prevailing wind speed. In the partial load operating mode in which the rotor blades are not yet blade-angle-controlled but instead have a fixed blade pitch angle, the generator power which is generated is directly dependent on the wind speed. As a result of the inertia of the rotor, a certain amount of averaging already takes place here. In the full load range, the blade pitch angle of the rotor blades is tracked through pitch regulation, in order to maintain the rated power. In this case, the instantaneous blade pitch angle is a good measure of the wind speed. In this case also, a certain amount of averaging already takes place as a result of the inertia of the system.

In one advantageous development of the invention, a plurality of the specified measured values, that is to say anemometer measurement, power drain and/or blade pitch angle can also be combined with one another in a suitable way, for example by means of situation-dependent weighting.

One preferred embodiment of the invention furthermore provides that the formation rule for the wind speed parameter is defined as a function of a current operating mode of the wind power plant. Therefore, in a case in which the wind power plant is deactivated, blade angle control is implemented for reasons of noise prevention or because of a request by a network operator, under certain circumstances already in the partial load operating mode, with the result that the wind speed can already be determined from the combination of the generator power and blade angle in the partial load range.

It has been found that with the, in particular, exclusive, use of the wind speed, measured by means of one of these abovementioned wind speed measures, it also being possible to use other wind speed measures arising from the operation of the wind power plant, safe and low-wear azimuth adjustment is implemented. It is not necessary to regulate the azimuth drives here.

A running mean is preferably formed by means of the at least one wind speed parameter, on the basis of which parameter the residual pressure and/or the residual holding torque are/is set, in particular over a duration of 30 seconds or 60 seconds. The running mean means that averaging is carried out by means of the measured wind speed over a running time window of a fixed length, for example 30 seconds or 60 seconds. Relatively old values are no longer taken into account. As a result, influences of incorrect measurements and of brief gusts or air pockets are averaged out, which simplifies the control of the azimuth adjustment. An equivalent effect can also be achieved by means of filter methods or delay elements, for example Pt2 elements, which are known from the prior art.

The azimuthal rotation is preferably stopped and the residual pressure and/or the residual holding torque are/is adapted if the at least one wind speed parameter changes by a predefinable value, in particular for a predefinable duration. The wear can therefore be reduced further if the wind speed abates, or the operating safety can be increased if the wind speed increases in that the corresponding residual pressure and/or the residual holding torque is adapted thereto. The predefinable values and/or times are adapted to the way in which the wind speed parameter is determined, for example to the averaging duration.

In this context, after the stopping, the residual pressure and/or the residual holding torque are/is preferably adapted to the at least one changed wind speed parameter, and the azimuthal rotation is resumed. A particularly safe setting and tracking of the residual pressure and/or of the residual holding torque is therefore implemented, since in this case this does not take place during the ongoing azimuth adjustment process. Therefore, the azimuth braking device can also be stopped more easily and does not have to be configured in such a way that it permits even a dynamic change during an azimuth adjustment process.

In one preferred embodiment there is provision that the residual pressure and/or the residual holding torque are/is set on the basis of a wind matrix table with two or more stages for the wind speed parameter or parameters. The stages for the wind speed can be oriented according to the various critical points of the wind speed profile of the wind power plant, for example the switch on wind speed, the wind speed at which the rated power is reached, that is to say the transition between the partial load operating mode and the full load operating mode and the switch-off speed. As an example, a corresponding wind matrix table, which can be embodied as a look-up table, can contain, for example, five different wind speed ranges, for example from 0 to 5 m/sec, from 5 to 7.5 m/sec, from 7.5 m/sec to 10 m/sec, from 10 m/sec to 14 m/sec, and at wind speeds above 14 m/sec. In such a case, the stage boundaries can also serve as the previously defined predefinable values for the adaptation of the residual holding torque or residual pressure, with the result that when such a stage is exceeded the next value from the table is used.

The residual pressure and/or the residual holding torque are/is set by means of a circuit of hydraulic valves which are connected in parallel and/or by means of signal stages during the actuation of the hydraulics.

Therefore, for example the use of hydraulic valves which are connected in parallel is well suited for the step-wise increasing of the residual holding pressure, as are, alternatively or additionally thereto, the signal stages in the actuation of the hydraulics. Signal stages can be, for example, stages of 4 to 20 mA of a signal current or 0 to 10 V of a signal voltage.

In one advantageous development, the residual holding torque is set by actuating different numbers of brake calipers with residual pressure. This means that the residual holding torque is set by means of a number of brake calipers to which residual pressure is applied. It is therefore possible, given the same residual pressure, to perform, in turn, stepped setting of the residual holding torque by means of the number of brake calipers, for example 1, 2, 3, 4 etc. brake calipers. A combination of the selection of the number of brake calipers or braking device and of the residual pressure can also be used to set the residual holding torque. The residual holding torque and residual pressure are independent of one another in this case.

The residual pressure and/or the residual holding torque are/is preferably set as a function of the at least one wind speed parameter if the at least one wind speed parameter can be determined, wherein the residual pressure and/or the residual holding torque are/is set to an, in particular predefinable, maximum value or safety value if it is not possible to determine a wind speed parameter, in particular in the case of an iced up state of the wind power plant. The case in which it is not possible to determine a wind speed parameter is thereby allowed for. Corresponding cases are the failure of an anemometer, for example as a result of mechanical problems or as a result of icing up, or the stationary state of the wind power plant, with the result that the power and blade angle do not permit any conclusion to be drawn about the wind conditions. However, so long as a wind speed parameter can still be determined with certainty, the method according to the invention is preferably carried out with wind-speed-dependent residual pressure and/or residual holding torque.

In such a case, one preferred development of the invention provides that in the case of operating parameters of the wind power plant which permit an iced up state of the wind power plant to be inferred, the residual pressure and/or the residual holding torque are/is set to a or to the maximum setting value. This has the advantage that, on the one hand, in the case of icing up, both the anemometers and the generator power can lead to the formation of an incorrect wind speed parameter. On the other hand, in particular in the case of icing up, rotor imbalances and therefore very large loads are to be expected in the azimuth system. In this respect, this development permits safe continued operation of the wind power plant even under iced up conditions.

The object on which the invention is based is achieved by means of an azimuth adjustment system for a wind power plant for the azimuthal rotation of a machine housing with a rotor on a tower of the wind power plant, comprising an azimuth adjustment device, an azimuth braking device and a control device which comprises an azimuth control process, wherein the control device is designed and configured to carry out an inventive method as described above. This involves, on the one hand, implementation of azimuth control software or azimuth control electronics in the control device of the wind power plant and, on the other hand, the suitable selection of wind measuring devices, that is to say anemometers, generator power measurement and/or blade pitch angle measurement and a suitable selection of the azimuth adjustment drives and azimuth brakes.

Finally, the object on which the invention is based is also achieved by means of wind power plant having a machine housing which is mounted in an azimuthally rotatable fashion on a tower and has a rotor with an inventive azimuth adjustment system as described above.

The features, properties and advantages which are mentioned with respect to the individual inventive subject matters, that is to say the inventive method, the azimuth adjustment system and the wind power plant apply without restrictions also to the other inventive subject matters which are related to one another.

Further features of the invention are apparent from the description of inventive embodiments together with the claims and the appended drawings. Inventive embodiments can satisfy individual features or a combination of a plurality of features.

BRIEF DESCRIPTION OF THE DRAWINGS

The invention will be described below on the basis of exemplary embodiments and with reference to the drawings without restriction of the general inventive concept, wherein reference is expressly made to the drawings with respect to all the inventive details which are not explained in more detail in the text. In the drawings.

In the drawings, in each case identical or similar elements and/or parts are provided with the same reference numerals, with the result that there is no renewed presentation in each case.

DETAILED DESCRIPTION OF THE INVENTION

Figure 1:
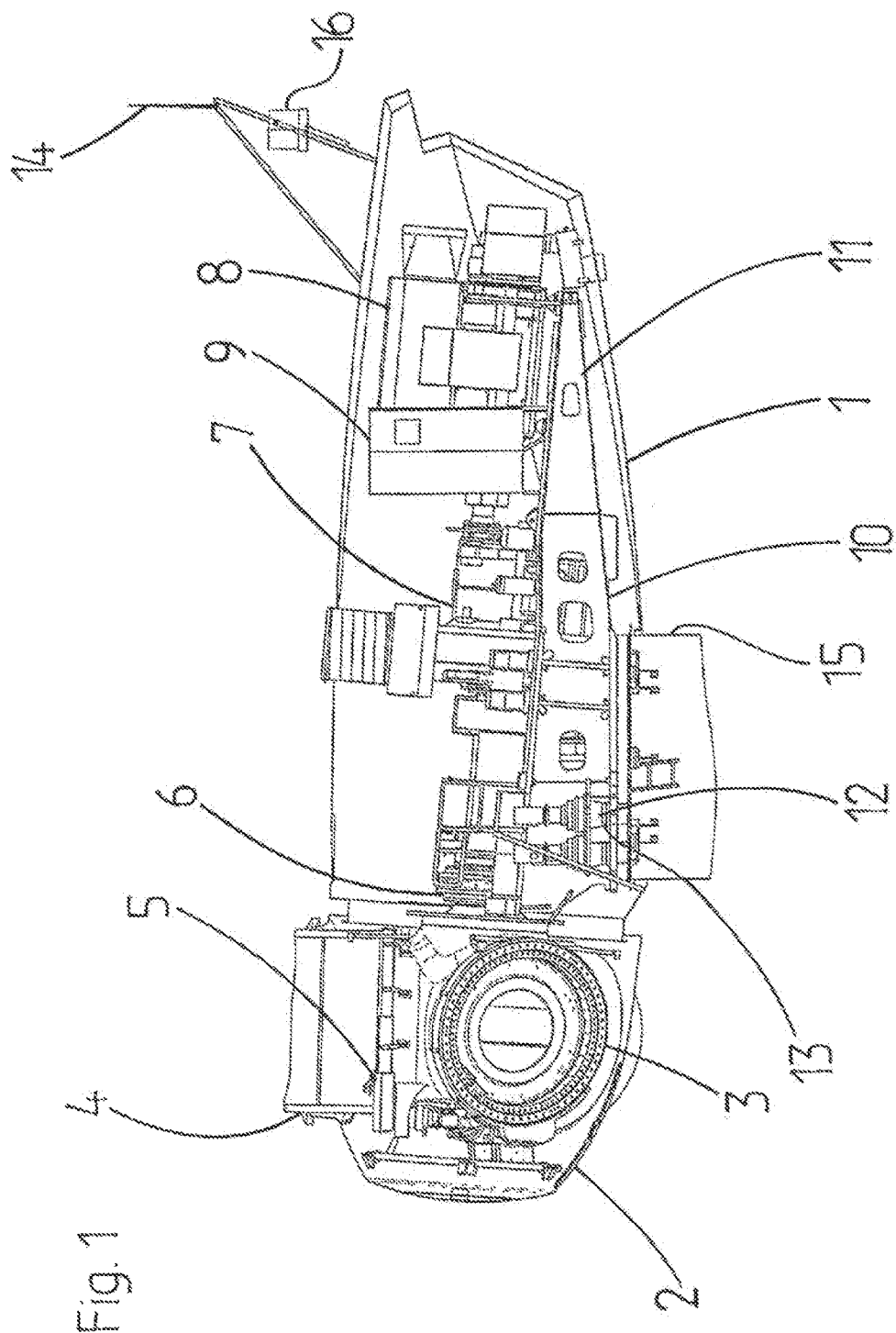
FIG. 1 shows a schematic illustration of a machine housing of a wind power plant.

FIG. 1 is a schematic illustration from the side of a machine housing 1 or of a gondola of a wind power plant. The machine housing 1 is adjoined by a rotor hub 2 with three rotor blade connections 3 for rotor blades 4. A rotor blade 4 is also illustrated with its blade-root-side end. The rotor blade connections 3 each have flanges for connecting a rotor blade 4 and blade angle adjustment devices for setting and fixing the rotor blade angle. A flange is provided with the reference symbol 5.

Within the machine housing 1, the rotor hub 2 is adjoined by a bearing system 6 for a slow rotor shaft which is connected directly to the rotor hub 2. The slow shaft is connected to a gear mechanism 7, with which the rotational speed of the slow rotor shaft is stepped down and transmitted to a fast shaft. The fast shaft, which adjoins the gear mechanism 7, leads to a generator 8 which is arranged at the rear-side end of the gondola 1. An electronic control device 9 with a power converter which adapts the electric current generated by the generator 8 in such a way that said electric current can be fed into a private or public power network is likewise shown.

In the lower range of the machine housing 1, a machine carrier with a main carrier 10 and a rear carrier 11 is illustrated. The main carrier 10 supports the bearing system 6 of the slow shaft, as well as the rotor hub 2 and the gear mechanism 7. The rear carrier 11 bears electrical components such as the generator 8, control and switching cabinets and, if appropriate, a transformer and the power converter. For the purpose of azimuthal rotation, that is to say for the purpose of rotating the machine housing 1 on the longitudinal axis of the tower 15, a plurality of azimuth drives 12, usually between four and sixteen, are arranged on the main carrier 10, said azimuth drives 12 rotating on the tower 15 by means of a gearwheel and crown gear mechanism of the machine housing 1. Further embodied adjacent thereto are azimuth brakes 13 which relieve the load on the azimuth drives 12. Said azimuth brakes 13 hold the machine housing 1 in a fixed, azimuth position as soon as an azimuth setpoint position is assumed. During an azimuth adjustment, a residual pressure is applied to them in order to decouple the azimuth drives 12 from external influences.

The machine housing 1 also has at its rear end a wind sensor system, for example an anemometer 16, and a lightning protection 14. A further lightning protection (not illustrated) is usually arranged in the region of the junction between the machine housing 1 and the rotor hub 2, in order to divert lightning strikes from the rotor blade 4 into the tower 15.

The main carrier 10 is manufactured from a cast body which has a sufficient strength to bear the components resting on the main carrier 10, and the comparatively soft material properties of said cast body are well suited to the damping of oscillations which occur continuously during the operation of the wind power plant. In particular, by virtue of its notch-free geometry, the cast body is particularly resistant to fatigue loading which has to be transmitted from the rotor into the tower 15. The rear carrier is welded from steel parts and takes up the weight forces and torques of the generator 8 as well as of the power converter 9 and transmits them to the main carrier 10 and the tower 15 by means of a connection between the main carrier 10 and the rear carrier 11. The rear carrier 11 is embodied in a sufficiently rigid fashion, as a cantilever arm which is clamped in on one side, in order to reliably avoid spring compression of the generator 8 during operation.

Figure 2:
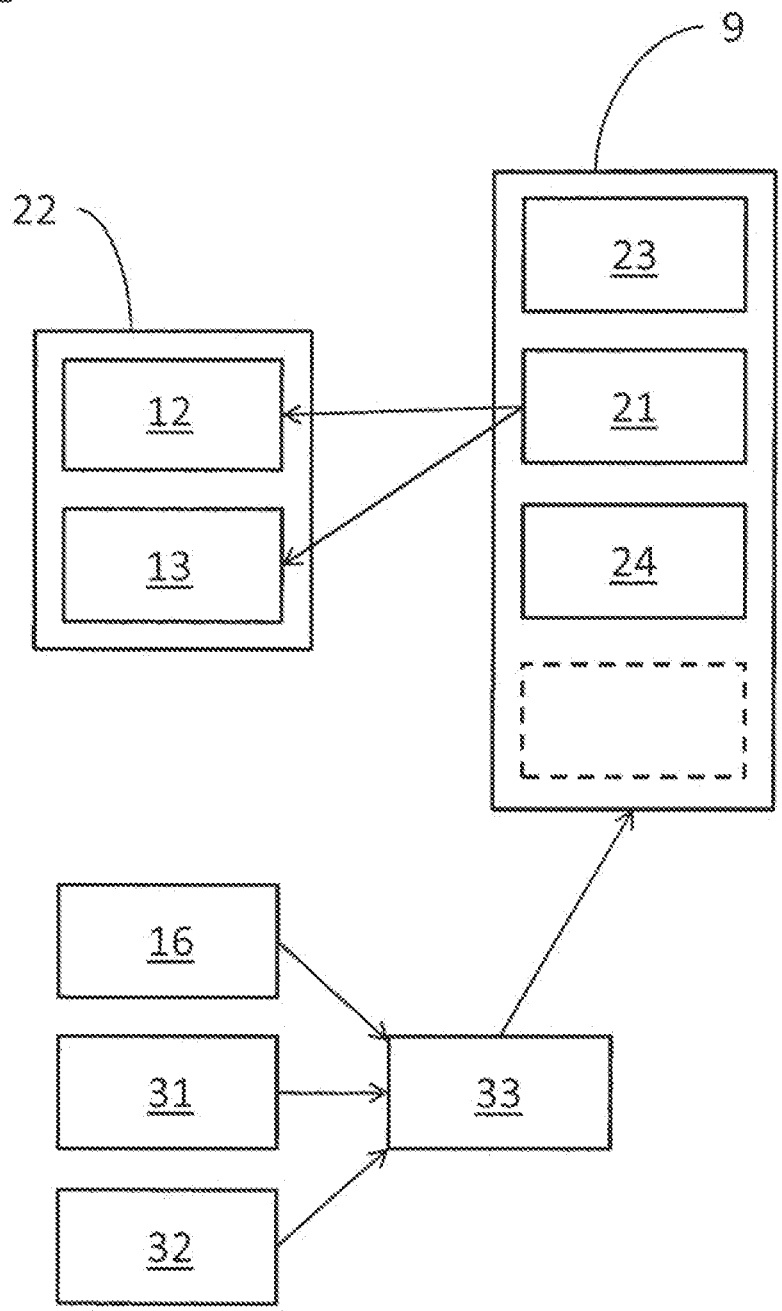
FIG. 2 shows a schematic illustration of an azimuth adjustment system.

FIG. 2 is a schematic illustration of a preferred embodiment of an azimuth adjustment system according to the invention with its individual parts. The core element is the control electronics 9 which carries out various parts of a wind power plant control process for example a pitch control process 23, an azimuth control process 21, the operational guidance 24 and further control functions. The azimuth control (process) 21 in the control electronics 9 serves to actuate one or more azimuth drives 12 and azimuth brakes 13 of an azimuth adjustment device 22 and therefore to move the machine housing 1 into an azimuth setpoint position by means of the azimuth drives 12 and azimuth brakes 13 according to requirements. After the azimuth setpoint position has been reached, the azimuth drive 12 is switched off and the azimuth brake 13 is locked in order to secure the machine housing 1 in the azimuth setpoint position.

In the method according to the invention and the azimuth adjustment system according to the invention, the control electronics 9 and the azimuth control 21 in the control electronics 9 receive the input of a wind speed parameter 33, on the basis of which the residual pressure and/or residual holding torque to be applied with the azimuth brake or brakes 13 can be applied. The at least one wind speed parameter 33 is formed from a measurement of a wind speed with an anemometer 16, a generator power 31 in the partial load operating mode of the wind power plant and/or a blade pitch angle 32 in the full load operating mode of the wind power plant. A double measurement, for example by means of an anemometer 16 and generator power 31 or by means of an anemometer 16 and blade pitch angle 32 is also possible in the partial load operating mode or full load operating mode, in order to provide redundancy or to produce a modified wind speed parameter 33.

In some operating situations, a wind power plant is powered down, for example at the request of a network operator when there is an excess supply of fed in power, for reasons of noise prevention or for other technical reasons such as, for example, protection again overheating for the generator or the power electronics of the plant. In such situations it may also already be necessary in the partial load range to use not only the power but also the blade angle of the wind power plant to form the at least one wind speed parameter. Therefore, the formation rule for the wind speed parameter is preferably defined as a function of the current operating mode of the wind power plant.

Furthermore there is provision that in the case of operating parameters of the wind power plant which permit an iced-up state of the wind power plant to be inferred, the residual pressure and/or the residual holding torque is set to a or the maximum setting value. This has the advantage that, on the other hand, in the case of icing up both the anemometers and the generator power can lead to the formation of an incorrect wind speed parameter. On the other hand, in particular in the case of icing up, rotor unbalances and therefore very large loads are expected in the azimuth system. In this respect, this development permits safe continued operation of the wind power plant even under iced-up conditions.

Figure 3:
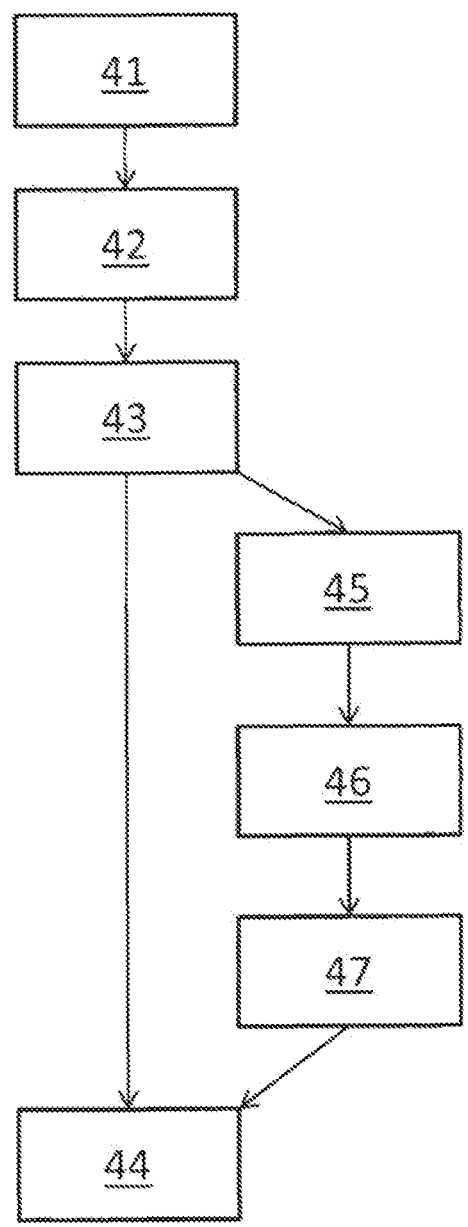
FIG. 3 shows a schematic illustration of the sequence of a method according to the invention.

FIG. 3 illustrates a schematic method sequence according to the invention. For example, when a maintenance position is required or after a change of a wind direction, a new azimuth angle or azimuth setpoint angle is requested in the method step 41. The azimuth control process 21 then determines, from the present wind speed parameter 33, the residual pressure which is to be set and/or the residual holding torque which is to be set and sets it in the method step 42 at the azimuth brake or the azimuth brakes 13.

In the subsequent method step 43, the azimuth adjustment is then started by actuating and activating the azimuth drive 12.

During the movement process, the wind speed parameter 33 continues to be determined continuously. If the wind speed parameter 33 changes during the adjustment process so little that a re setting or change of the residual pressure and/or of the residual holding torque is not necessary, the method step 44 is reached directly and without interruption, in which method step 44 the azimuth setpoint position has been reached and the azimuth adjustment is ended.

If the wind speed parameter 33 changes for a predefinable time period and/or beyond a predefinable amount during the movement process, it is possible to stop the movement process in a method step 45. Then, in the method step 46 the residual pressure and/or the residual holding torque are/is adapted to the changed wind speed, and in the method step 47 the movement process of the azimuth adjustment is started again. If a change in the wind speed occurs again in the further movement process, the steps 45 to 47 can be correspondingly repeated until the azimuth setpoint position is reached in the method step 44, and the azimuth adjustment is ended.

The method according to the invention permits relatively low wear on the brake linings with a simultaneously simpler embodiment than described in DE 10 2008 004 948 A1. As a result of the relatively low wear, there is also less formation of abrasion, which is responsible primarily for a strong generation of noise, for example, squeaking or humming. Less noise also occurs during the movement. As a result of a lower counter-torque, the azimuth drives are also relieved of loading.

The adjustment and change in the residual holding torque or residual pressure can take place in stages or in an infinitely variable fashion.

All the specified features, also those which can be found solely in the drawings and also individual features which are disclosed in combination with other features, are considered to be essential to the invention both alone and in combination. Inventive embodiments can be satisfied by means of individual features or a combination of a plurality of features.

LIST OF REFERENCE SYMBOLS USED IN DRAWING FIGURES

1 Machine housing
2 Rotor hub
3 Rotor blade connection
4 Rotor blade
5 Flange
6 Bearing system of the slow rotor shaft
7 Gear mechanism
8 Generator
9 Control electronics with power converter
10 Main carrier
11 Rear carrier
12 Azimuth drive
13 Azimuth brake
14 Lightning protection
15 Tower
16 Anemometer
21 Azimuth control process
22 Azimuth adjustment device
23 Pitch control process
24 Operational control process
31 Generator power
32 Blade pitch angle
33 Wind speed parameter
41 Requesting of new azimuth angles
42 Setting of a residual pressure
43 Starting of the azimuth adjustment
44 Reaching of the azimuth setpoint position, end of the azimuth adjustment
45 Stop when the wind speed changes
46 Adaptation of the residual pressure
47 Resumption of the azimuth adjustment

What is claimed is:

1. A method for adjusting an azimuth of a machine housing on a tower of a wind power plant comprising applying a constant residual pressure for generating a constant residual holding torque to at least one azimuth braking device during an azimuthal rotation of the machine housing, wherein the constant residual pressure and/or the constant residual holding torque are/is set as a function of at least one wind speed parameter before commencement of the azimuthal rotation, and wherein the residual pressure and/or the residual holding torque are/is not changed during the azimuthal rotation.

2. The method according to claim 1, wherein the residual pressure and/or the residual holding torque are/is not changed during energization of azimuth drive motors.

3. The method according to claim 1, wherein the at least one wind speed parameter is based on a measurement of wind speed with at least one anemometer, on a generator power and/or a blade pitch angle of rotor blades of a rotor of the wind power plant, and wherein a formation rule for the at least one wind speed parameter is defined as a function of a current operating mode of the wind power plant.

4. The method according to claim 1, wherein the at least one wind speed parameter is a running mean of wind speed over a time duration, and the residual pressure and/or the residual holding torque are/is set on a basis of the running mean of wind speed over the time duration.

5. The method according to claim 4, wherein the time duration is 30 seconds or 60 seconds.

6. The method according to claim 1, wherein the azimuthal rotation is stopped and the residual pressure and/or the residual holding torque are/is adjusted if the at least one wind speed parameter changes by a predefined value.

7. The method according to claim 1, wherein the azimuthal rotation is stopped and the residual pressure and/or the residual holding torque are/is adjusted if the at least one wind speed parameter changes by a predefined value for a predefined duration.

8. The method according to claim 1, wherein the azimuthal rotation is stopped if the at least one wind speed parameter changes by a predefined value or for a predefined time.

9. The method according to claim 1, wherein the azimuthal rotation is stopped if the at least one wind speed parameter changes by a predefined value and for a predefined time.

10. The method according to claim 6, wherein after the azimuthal rotation is stopped, the residual pressure and/or the residual holding torque are/is adjusted as a function of the changed wind speed parameter, and azimuthal rotation is resumed.

11. The method according to claim 1, wherein the residual pressure and/or the residual holding torque are/is set on a basis of a wind matrix table with two or more stages for the at least one wind speed parameter.

12. The method as according to claim 1, wherein the residual pressure and/or the residual holding torque are/is set by a circuit of hydraulic valves, which are connected in parallel and/or by signal stages during actuation of the hydraulic valves.

13. The method according to claim 1, wherein the residual holding torque is set by a number of brake calipers to which residual pressure is applied.

14. The method according to claim 1, wherein the residual pressure and/or the residual holding torque are/is set as a function of the at least one wind speed parameter when the at least one wind speed parameter is determined on a basis of one or more measured values, but the residual pressure and/or the residual holding torque are/is set to a predefined, maximum value or safety value when it is not possible to obtain the one or more measured values for determining the at least one wind speed parameter.

15. The method according to claim 14, wherein the predefined, maximum value or safety value is used in an iced up state of the wind power plant.

16. An azimuth adjustment system for adjusting an azimuth of a machine housing on a tower of a wind power plant, the azimuth adjustment system comprising:
- an azimuth braking device; and
- a control device, which comprises an azimuth control;
- wherein the control device is designed and configured to carry out the method according to claim 1.

17. A wind power plant having a machine housing which is mounted in an azimuthally rotatable fashion on a tower and which has a rotor, comprising an azimuth adjustment system as claimed in claim 16.

* * * * *